(12) United States Patent
Buzby et al.

(10) Patent No.: US 6,687,845 B2
(45) Date of Patent: Feb. 3, 2004

(54) FAULT VECTOR POINTER TABLE

(75) Inventors: Wayne R. Buzby, Phoenix, AZ (US); Sidney L. Andress, Glendale, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 439 days.

(21) Appl. No.: 09/742,456

(22) Filed: Dec. 20, 2000

(65) Prior Publication Data

US 2002/0112202 A1 Aug. 15, 2002

(51) Int. Cl.[7] .............................................. G06F 13/24
(52) U.S. Cl. .............................. 714/2; 714/34; 714/48; 710/48; 710/260; 710/269
(58) Field of Search ........................... 714/2, 3, 10, 27, 714/34, 45, 42, 46, 48; 710/48, 260, 269; 707/202

(56) References Cited

U.S. PATENT DOCUMENTS

| | | | | |
|---|---|---|---|---|
| 4,926,322 A | * | 5/1990 | Stimac et al. | 703/23 |
| 5,504,906 A | * | 4/1996 | Lutoff | 709/316 |
| 5,596,755 A | * | 1/1997 | Pletcher et al. | 710/261 |
| 6,023,750 A | * | 2/2000 | Hansen et al. | 711/220 |
| 6,167,425 A | * | 12/2000 | Beckhoff | 709/103 |
| 6,351,802 B1 | * | 2/2002 | Sheaffer | 712/215 |

* cited by examiner

*Primary Examiner*—Robert Beausoliel
*Assistant Examiner*—Joseph D Manoskey
(74) *Attorney, Agent, or Firm*—James H. Phillips; Bruce E. Hayden

(57) ABSTRACT

A fault number is utilized by microcode fault handling to index into a fault array pointer table containing a plurality of pointers to entry descriptors describing fault handling routines. The pointer resulting from the indexing is utilized to retrieve an entry descriptor. The entry descriptor is verified and if valid, is utilized to setup the environment for the appropriate fault handling routine and to enter such. The fault array pointer table is located in a reserved memory that cannot be overwritten by I/O. During the boot process, the fault array pointer table entries, along with a fault-on-fault pointer are updated to point at entry descriptors stored in the reserved memory. Additionally, the fault-on-fault entry descriptor that rebuilds the processor environment if necessary from information in reserved memory.

19 Claims, 7 Drawing Sheets

FAULT VECTOR POINTER TABLE

CROSS REFERENCE TO RELATED APPLICATION

This application is related to our copending patent application Ser. No. 09/742,457, entitled "FAULT HANDLING IN A DATA PROCESSING SYSTEM UTILIZING A FAULT VECTOR POINTER TABLE", filed of even date herewith and assigned to the assignee hereof.

FIELD OF THE INVENTION

The present invention generally relates to data processing system fault handling, and more specifically to data structures utilized in such data processing system fault handling.

BACKGROUND OF THE INVENTION

In a typical data processing system, input and output completions are typically signaled by interrupts. This concept was extended to cover other external as well as internal events. Herein, a distinction will be made between responding to external events, herein termed "interrupts", and responding to internal events, herein termed "exceptions" or "faults". It should be noted that the distinction between interrupts and exceptions or faults is somewhat arbitrary, as some architectures do not make such a distinction.

An exception then is the happening of an internal event within a computer within a data processing system. Exception handling is the action taken by a computer processor to respond to the exception. Some typical exceptions are page faults, zero divide, supervisory call, illegal instruction, privileged instruction (when not in a mode allowing execution of such), security violations, timer or decrementer expiration, and traps. Other exceptions are within the ambit of this disclosure.

Typically, exception handling or exception processing involves diverting control or instruction flow from where the computer processor was executing prior to the exception to an exception handling routine. Typically again, there will be a different exception handling routine for each exception type and even subtype. The exception handling routines are typically a portion of the operating system controlling each computer processor in the data processing system. The exception handling routine for a given exception will typically programmed to determine how to handle a particular exception type. For example, the task that attempts to execute a privileged instruction, performs a security violation, or a zero divide, will typically be aborted by the operating system, after providing for the possibility of dumping the job containing the task. On the other hand, in the case of a page fault, the operating system will typically suspend the task causing the page fault, initiate reading the requested page of memory from disk, and dispatch another task to execute. The task causing the page fault will be redispatched later after the missing page has been retrieved from disk. In the case of expiration of a timer, the executing task is placed on a dispatch queue, and another task is dispatched.

It should be noted here that the above mechanisms require that the exception handler save the current execution environment in the computer processor so that it can be returned to at some later time. Upon completion of exception processing for a given exception, control is returned to the saved environment, typically at either the instruction causing the exception (for example in responding to a page fault), or at the next instruction after that instruction (for example in responding to a supervisor request). Indeed, this mechanism is the fundamental method used by the dispatcher in a modern operating system to accomplish dispatching of tasks. Partly this is done through the fairly complete control over the information in the saved environment of a task that the operating system has.

Since exception handling is typically part of the operating system controlling a data processing system, and since exception handling routines typically require almost full control of the computer processor, including the ability to execute privileged instructions, and to read and write almost all memory, exception handling routines will typically be entered with the highest possible privilege level. Typically this means that exception handling will be entered in a prespecified maximum security mode.

In order for a computer processor to respond to an exception, it must be aware of the location of the appropriate exception processing routine. In some data processing systems, such as GCOS®8 from assignee of this invention, the entry descriptor for a general exception or fault handling routine is retrieved from a specified location (octal 032) in memory and evaluated. The entry descriptor specifies the environment for the exception processing routine, including which segments are visible, the routine starting address, and what privileges to enable. It is treated by the computer processor almost like an ICLIMB subroutine call, laying down a safe store stack frame containing the saved environment. An OCLIMB instruction can be later executed to return control back to the location of the exception or fault. Within the fault handling routine (titled "Fault"), a determination is made as to the fault (or exception) code causing the exception. This then is used to invoke the appropriate exception processing routine for that type of fault, again with an "ICLIMB" instruction.

Other mechanisms are typically used in less secure data processing systems. For example, in the Intel X86 architecture, there is a fault or exception vector stored at a specified location in memory containing a number of exception handling routine addresses. When an exception occurs, control is transferred to the address at the specified location in the exception vector corresponding to that exception type. As noted above, the environment of the exception handling is automatically set to a prespecified maximum security state. Most of the environmental saving and restoring required is done by general purpose instructions that store and later load processor registers.

Somewhat more sophisticated is the exception processing in a Motorola or IBM PowerPC® processor environment. Instead of having an exception (or fault) vector containing addresses of exception handling routines, the exception handling routine for each exception handling type begins execution in response to the occurrence of the exception being handled, at the first word in a block of memory at a specified location in memory. Each exception type has its own block of memory starting at its specified location in memory. The PowerPC architecture contains a couple of enhancements in sophistication over the X86 architecture discussed before. First, instead of one set of exception routine routines or exception vector, there are two. The selection of which of the two to utilize is determined by a static bit in a reserved status register in each computer processor. Typically, one set of exception routines are utilized at system startup. The bit is then toggled, and the other set of exception routines is then utilized thereafter. Secondly, instead of always initiating exception processing with the same high security environment, the PowerPC architecture specifies slightly different processing environments for the start of exception processing for different exception types.

Other data processing system architectures utilize similar mechanisms to the above.

There are problems with all of the above mechanisms. One problem with the GCOS 8 mechanism disclosed above is that it requires the equivalent to two ICLIMB instructions to enter the appropriate fault or exception handling routine, and two OCLIMB instructions to return. These are some of the most expensive instructions in the GCOS 8 processor instruction repertoire to execute in terms of computer instruction cycles, typically taking over 100 cycles each to execute. Thus, it would be preferable to be able to perform fault processing more efficiently, with the expenditure of fewer instruction cycles.

Both the X86 and PowerPC approaches suffer from being unable to automatically fine tune the processor environment to the exception type being processed. Thus, with the minor exceptions noted above for the PowerPC architecture, all exception handling in both architectures begins execution in the identical processor environment. This means that the same memory is visible to all fault handling routines, as well as most (PowerPC) or all (X86) of the same processor privileges are in effect.

One problem that is common to all three approaches or mechanisms is that in certain instances, the exception vector or exception handling routines are mistakenly overlaid by other data. This is compounded because these are typically in physical memory with low fixed addresses. In the X86 environment, given its minimal security, this overlaying happens frequently. However, even in the most secure operating system, such as GCOS 8, it still happens. One major cause of this is issuance of erroneous input/output (I/O) requests.

The problem that this causes is that it exception processing will thereafter fail, when the processor is unable to either find the required exception processing routines, or if it can find such, it cannot execute them, as they no longer exist, having been overwritten. This sort of problem is often hard to diagnose since one of the functions that can result from exception processing the generation of a dump of the processor and its memory. No exception processing typically means no dump. One advantage of the higher security GCOS 8 architecture is that overlaying of the entry descriptor for the fault handler is easily detected as it typically no longer is a valid entry descriptor.

When a computer processor causes an exception or fault while processing an exception or fault, it is termed here "fault-on-fault". In the prior art, this typically ultimately resulted in halting the computer processor, if not explicitly, at least implicitly. In the above scenario, when either the exception vector, or the exception processing routines, are overlaid, even when exceptions are prioritized, the processor will ultimately end up attempting to process some exception while in the process of processing that very same exception. For example, if the exception handling routines have been overlaid, then the processor will (hopefully) recognize an illegal instruction exception while executing code in the overlaid area. If this in turn results in attempting to execute code in the overlaid area, recovery is impossible.

The GCOS 8 architecture does provide a partial solution to the "fault on fault" problem outlined above. When a program fault or exception is detected during fault processing, a second fault or exception handling routine is invoked, instead of the first one described above. It is entered by loading and evaluating a second entry descriptor located at another specified location in memory. However, this is not a complete solution since it sometimes happens that the same situation that resulted in the second fault (the "fault within fault") also resulted in either the entry descriptor for the second fault handler being overlaid, or the code for the second fault handler itself being overlaid.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A fault number is utilized by microcode fault handling to index into a fault array pointer table containing a plurality of pointers to entry descriptors describing fault handling routines. The pointer resulting from the indexing is utilized to retrieve an entry descriptor. The entry descriptor is verified and if valid, is utilized to setup the environment for the appropriate fault handling routine and to enter such. The fault array pointer table is located in a reserved memory that cannot be overwritten by I/O. During the boot process, the fault array pointer table entries, along with a fault-on-fault pointer are updated to point at entry descriptors stored in the reserved memory. Additionally, the fault-on-fault entry descriptor that rebuilds the processor environment if necessary from information in reserved memory.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
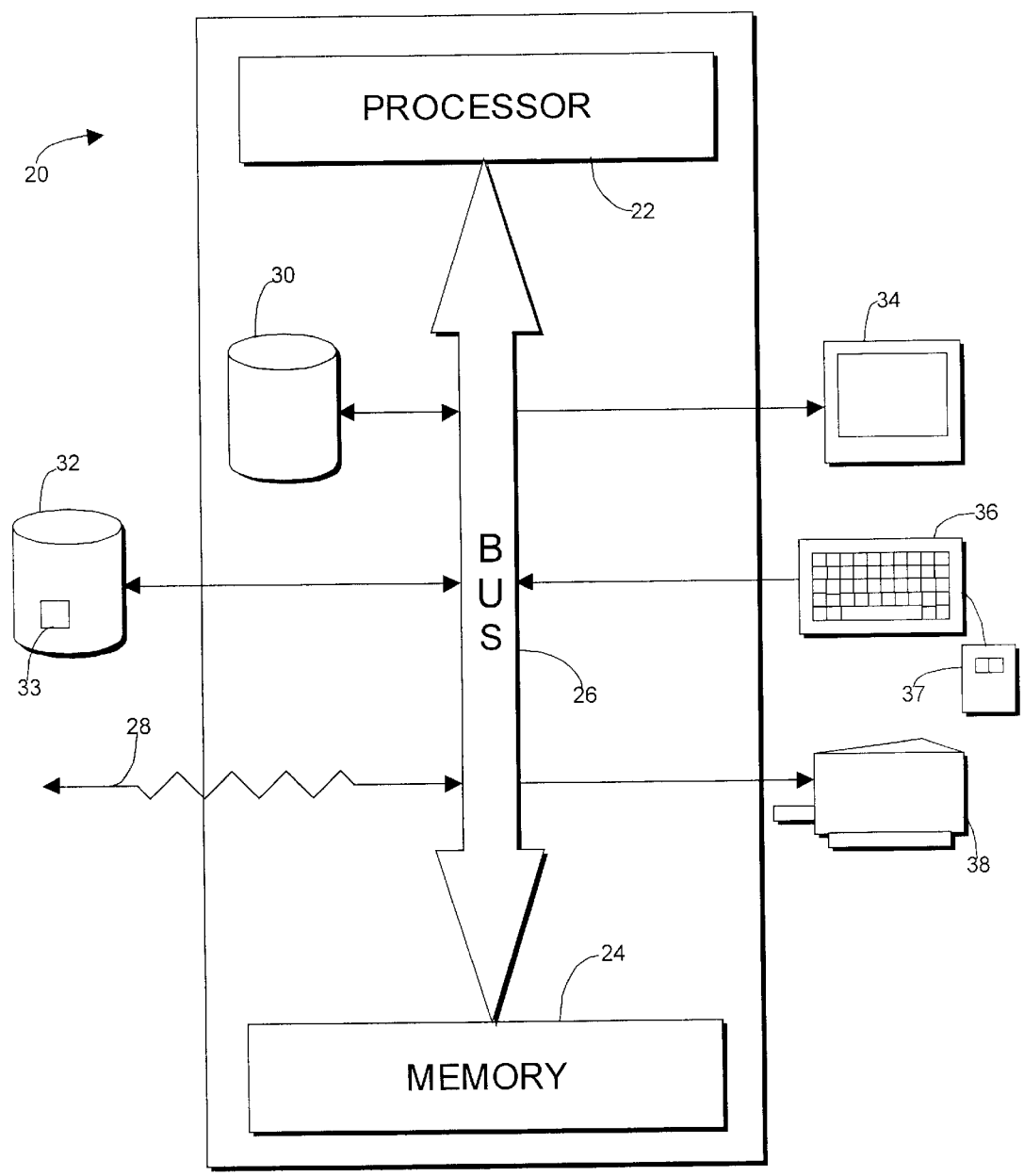
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
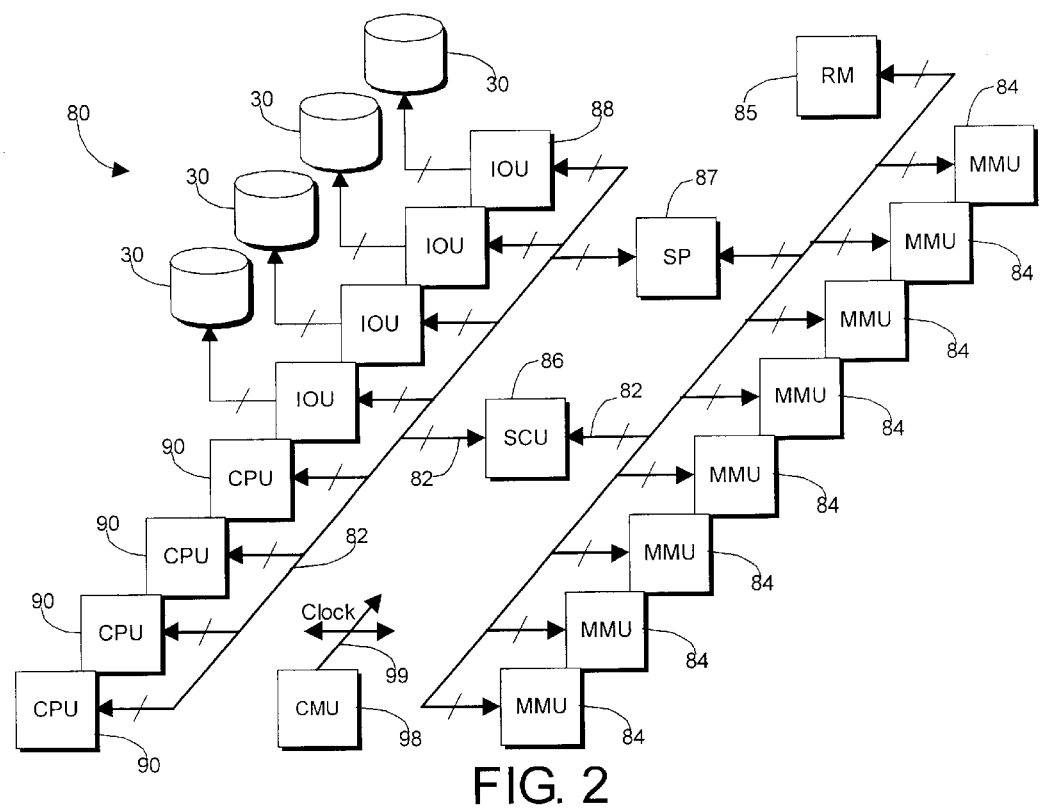
FIG. 2 is a block diagram of a more detailed view of a multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Also bidirectionally coupled to the intramodule bus 82 are a service processor (SP) 87 and reserved memory 85. The service processor 87 is utilized to perform maintenance on the system 80. It controls partitioning of processors 92, IOUs 88, and MMUs 84 into multiple system images, as well as determining which major components are available to which system at which time. Though not shown here, the SP 87 typically also contains nonvolatile storage to maintain static systems configuration information. It also typically contains a modem allowing remote support systems to be contacted automatically whenever an error is detected in the system 80.

Reserved memory 85 is similar to the memory installed in the MMUs 84, with the limitation that it is "write" protected except in special situations. The processors 92 utilize special instructions to write to reserved memory 85. Additionally, reserved memory 85 cannot be written by Input or Output (I/O) operations. The SP 87 starts each processor 92 with a "Connect" command. Prior to this, it has initialized a processor specific area of the reserved memory 85 for that processor 92. The processor 92 utilizes this processor specific area of reserved memory 85 to determine what channels and peripherals are configured as being connected to it.

Figure 3:
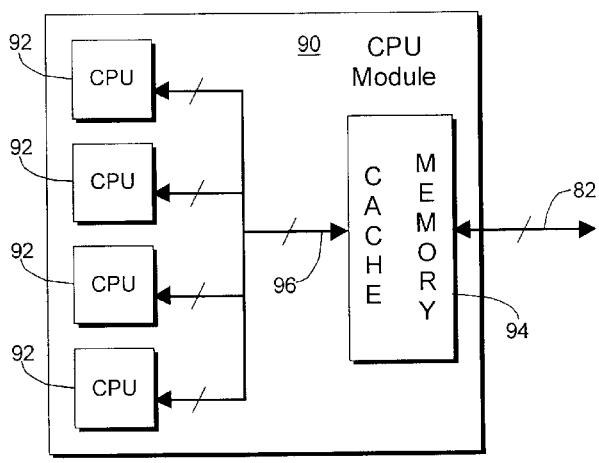
FIG. 3 is a block diagram illustrating a processor (CPU) module as shown in FIG. 2.

FIG. 3 is a block diagram illustrating a processor (CPU) module 90 as shown in FIG. 2. The CPU module 90 contains a plurality of processors (CPU) 92 and a cache memory system 94. In the preferred embodiment, each processor (CPU) module 90 contains up to four (4) processors (CPU) 92. The processors 92 and the cache memory system 94 are coupled together and communicate over an intraprocessor bus 96.

The cache memory system 94 is shared among the processors 92 on the CPU module 90 and maintains cache copies of data loaded into those processors 92. The cache memory system 94 is considered here a Level 2 cache and is coupled to and communicates with the storage control system (SCU) 88 over the intramodule bus 82 in order to maintain cache coherency between Level 2 cache memories 94 on each of the processor modules 90, as well as between cache memories 256, 258 (FIG. 4) in each of the processors 92, and on the IOU modules 88. The SCU 88 also maintains coherency between the various cache memories 94, 256, 258, and the typically slower speed memory in the MMU modules 84. In the preferred embodiment, a single block of memory will be owned by a single cache or memory at potentially each level in the memory hierarchy. Thus, a given memory block may be owned by one Level 1 cache 256, by one Level 2 cache 94 and by one MMU 84.

Figure 4:
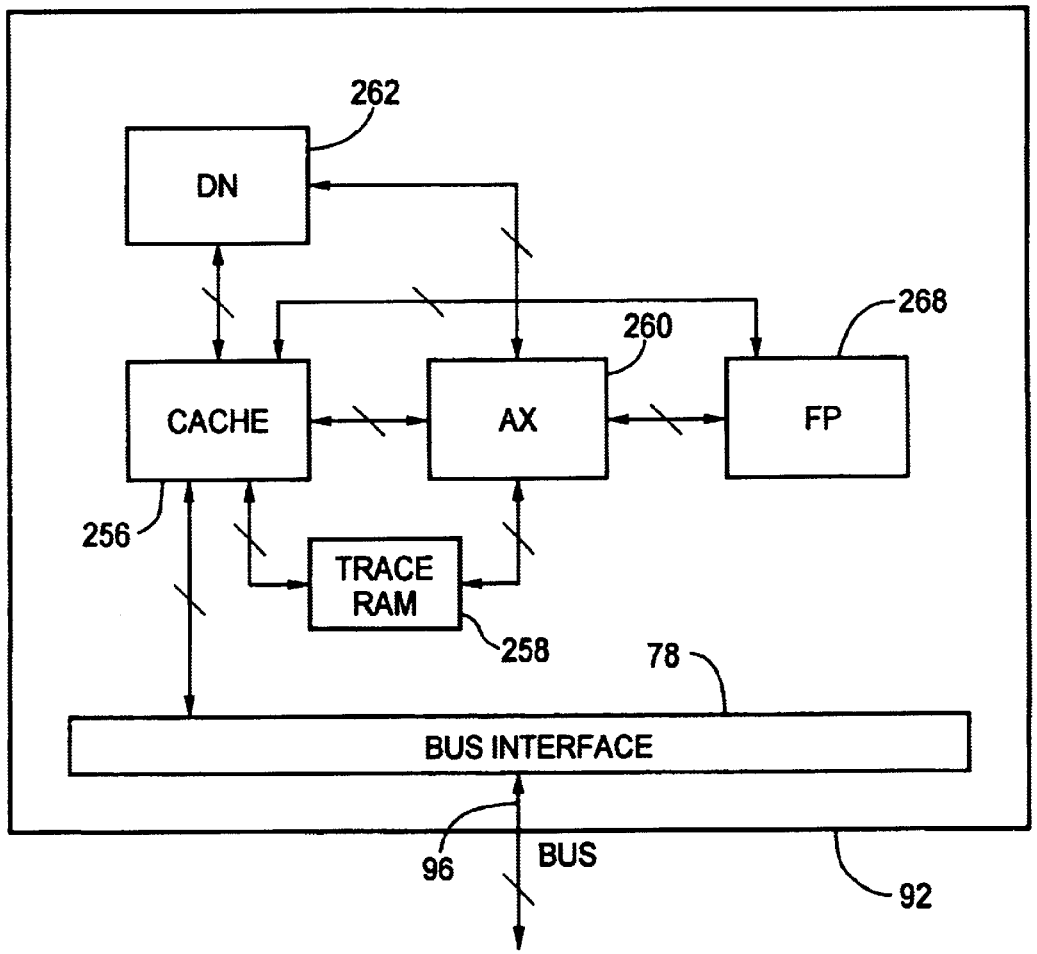
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating point unit 268 performs both floating point operations, and fixed point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Bidirectionally coupled to both the AX unit 260 and the local cache 256 is a Trace RAM cache 258 which is capable of caching the status of instruction or cache operation. The Trace RAM 258 is controlled by commands decoded and executed by the AX unit 260. The Trace RAM 258 also selectively traces AX unit 260 statuses. The Trace RAM 258 receives and selectively traces cache state signals from the local cache 256. When a Trace is complete, the Trace RAM 258 can be written out to the local cache 256, and ultimately to slower memories.

Figure 5:
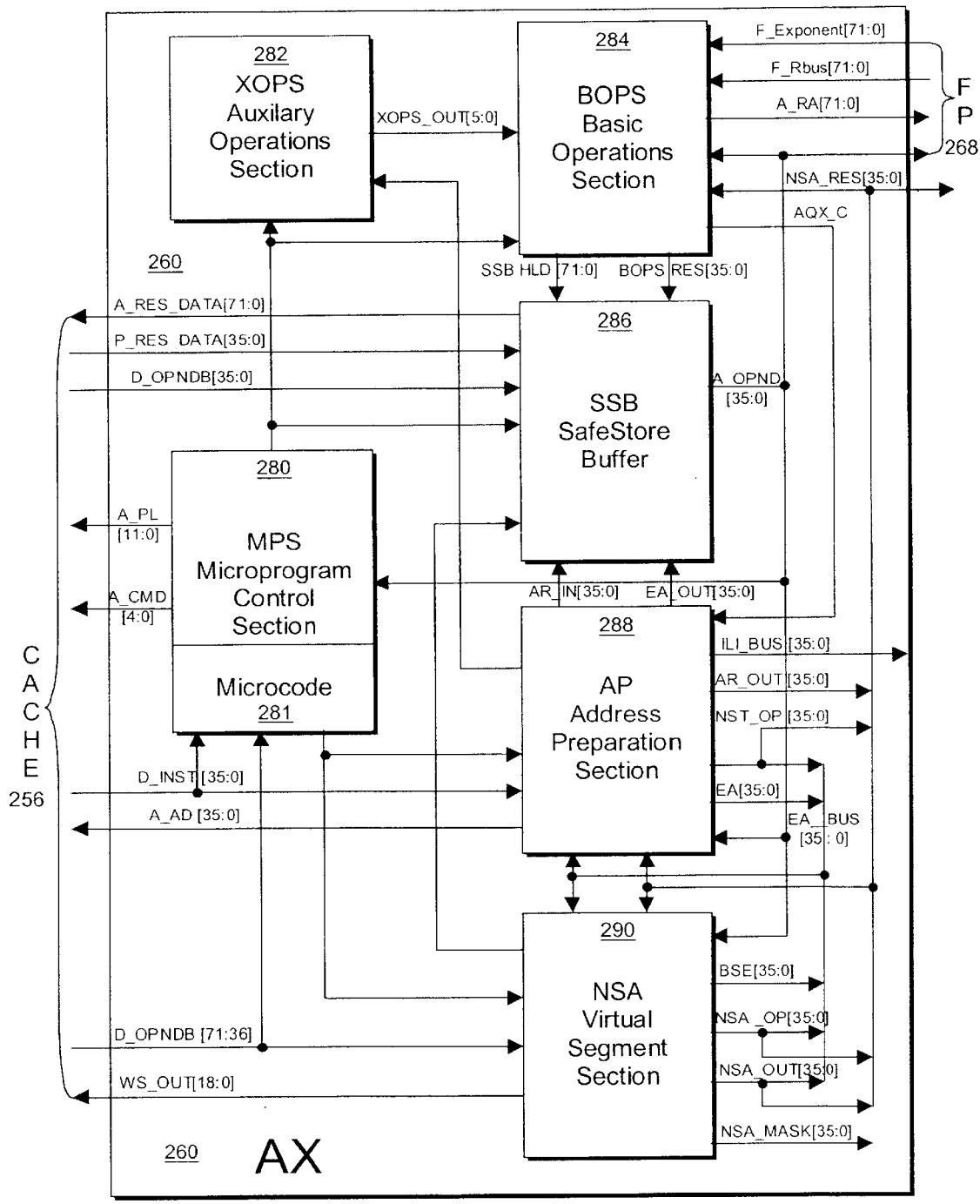
FIG. 5 is a block diagram of an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262, the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 stores the current status of the processor 92 environment, including user and segment registers, for the purpose of changing processor state. The SSB 286 is coupled to and receives signals from the BOPS 284, the AP section 288, the MPS 280, and the NSA 290. The SSB 286 is bidirectionally coupled to the local cache 256, allowing SSB 286 frames to be pushed out to cache 256 when entering a new processor environment, and pulled back from cache 256 when returning to an old processor environment.

Figure 6:
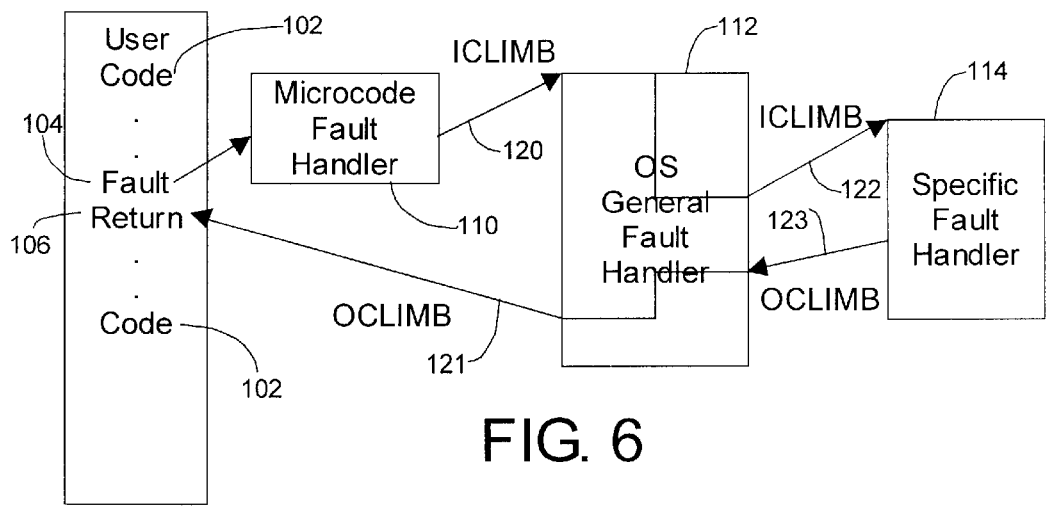
FIG. 6 is a block diagram of the interrupt structure for each processor in FIG. 3, in accordance with the prior art.

FIG. 6 is a block diagram of the interrupt structure for each processor 92 in FIG. 3, in accordance with the prior art. Whenever a system fault occurs, an attempt by system microcode is made to invoke fault handling in the operating system through a special variant of a "Climb" instruction. A two word entry descriptor is retrieved from a specified location (032 Octal) in memory. This entry descriptor specifies the environment and starting address of the interrupt processing to be performed. The standard operating system fault processing code then utilizes a fault code supplied by the microcode to determine the exact actions that are required to be performed in response to the fault being handled. Should the processor 92 fail in its attempt to enter and execute fault handling code, a second two word entry descriptor is retrieved from a second specified location (040 Octal) in memory. This second entry descriptor specifies a "fault on fault" fault handler.

During execution of code 102, a fault 104 is detected by a processor 92. The fault 104 causes execution of microcode fault handler 110. The Microcode fault handler 110 causes a safe store stack frame to be laid down containing the environment of that processor 92 as the processor 92 executes a variant of an ICLIMB instruction 120 to enter a general fault routine 112 described by the entry descriptor 304 stored at the specified location (032) in memory. The general fault routine 112, which is part of the operating system (OS) controlling the processor 92, then determines what fault 104 occurred. The fault 104 is identified by a six bit fault number. Based on this six bit fault number, a specific fault handler 114 is selected and entered, again by use of an ICLIMB instruction 122, again laying down a safe store stack frame. Upon completion of fault handling in the specific fault handler 114, an OCLIMB instruction is executed 123 utilizing the second safe store stack frame to return to the general fault hander 112, and it in turn causes execution of a second OCLIMB instruction 121 utilizing the first safe store stack frame to return 106 control to execution of the code 102 that had been interrupted by the fault 104.

The prior art interrupt structure shown in FIG. 6 has a number of short comings. First, in order to enter fault handling for any faults, typically two different environment transfer (i.e. "ICLIMB") instructions are executed, laying down two safe store stack frames. The first environment transfer is made automatically by the microcode and transfer is made into the specified general fault handling routine. Then this general fault handling routine determines which fault has occurred, and what routine needs to be called to handle that fault. This requires the second ICLIMB. After the specific fault handling routine has accomplished the appropriate fault handling, two more environment transfers (i.e. "OCLIMB") instructions are executed to return to the code being executed when the original fault occurred. Thus four environment transfers are required to handle most faults. Environment transfers are typically quite expensive.

Secondly, it sometimes happens in even a system with the best security that memory areas are inadvertently overwritten. In systems with weak security, this can be done by user programs. In more secure systems, it can still be done by either privileged operating system functions, or Input/Output. This can cause serious problems when the area being overwritten contains the entry descriptors for the fault handling routines or the fault handling routines themselves. This is typically detected in the GCOS 8 system by the microcode when it attempts to utilize an entry descriptor retrieved from the overwritten area. If the "fault on fault" entry descriptor has also been overwritten, it becomes extremely difficult to dump the system in order to determine what caused the fault and what caused the inadvertent overwriting of system memory.

Figure 7:
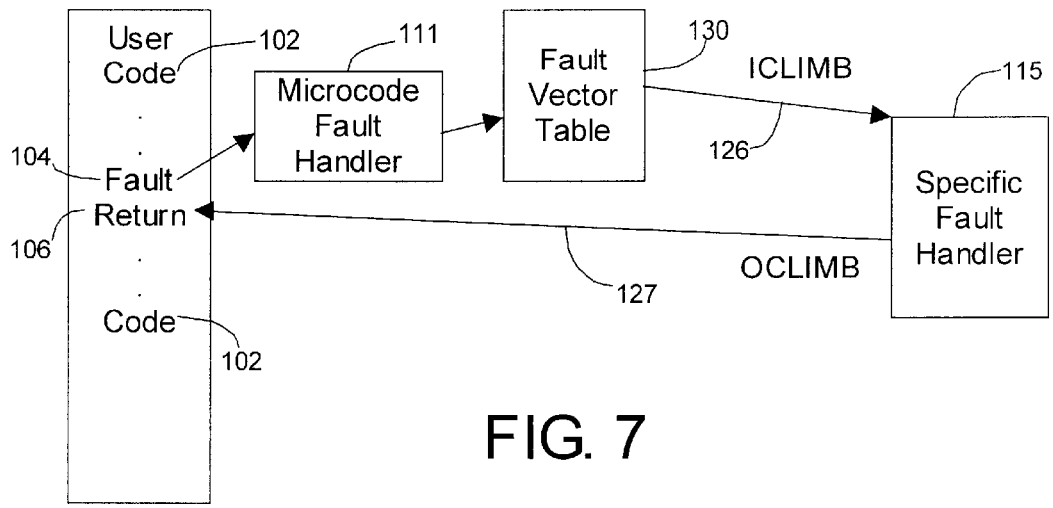
FIG. 7 is a block diagram of the interrupt structure for each processor in FIG. 3, in accordance with a preferred embodiment of the present invention.

FIG. 7 is a block diagram of the interrupt structure for each processor 92 in FIG. 3, in accordance with a preferred embodiment of the present invention. During execution of code 102, a processor 92 enters its microcode fault handler 111 upon detection of some fault 104. The microcode fault handler 111 utilizes the six bit fault code to index into a 64-entry fault vector pointer table 130. Each of the 64 entries fault vector pointer table 130 contains an address of a two word entry descriptor 304 which describes the specific fault handler 115 for the corresponding fault type. The appropriate entry descriptor 304 is retrieved and utilized to ICLIMB 126 to the specific fault handler 115, laying down a safe store stack frame. Upon completion of the actions by the specific fault handler 115, an OCLIMB 127 instruction is executed, utilizing the safe store stack frame to return 106 execution control to the code 102 originally being executed.

Figure 8:
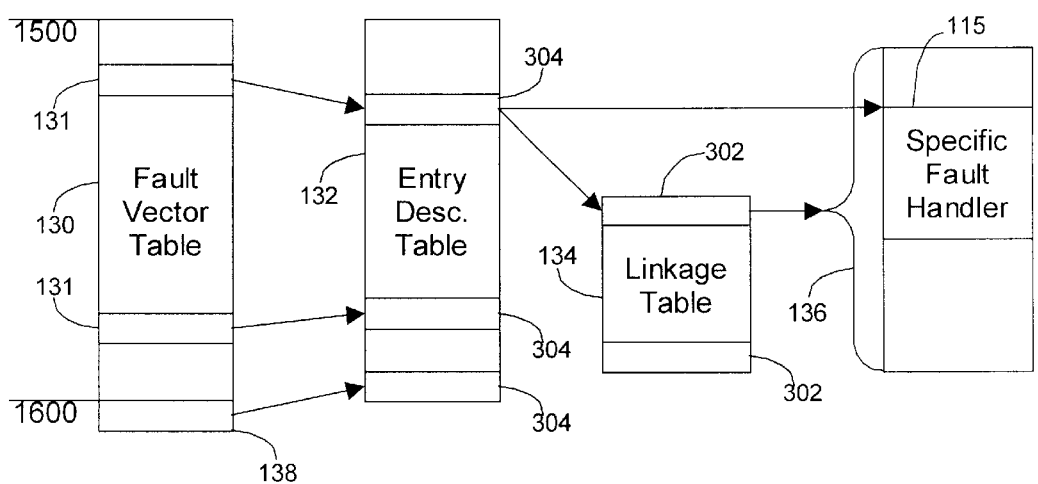
FIG. 8 is a block diagram illustrating the data structures utilized in FIG. 7.

FIG. 8 is a block diagram illustrating the data structures utilized in FIG. 7. The fault vector pointer table 130 contains sixty-four one-word entries and is located at a specified location (01500 Octal) in reserved memory 85. Each entry 131 in the fault vector pointer table 130 contains the address of an entry descriptor 304 for a specific fault handler for the corresponding fault type. Each entry descriptor 304 points at a segment descriptor 302 in a linkage table 134, with a corresponding segment descriptor 302 describing the segment containing the specific fault handler 115. Each entry descriptor 304 also specifies the starting address for the specific fault handler 115 in the specified segment described by the corresponding segment descriptor 302. Note that the entry descriptors 304 combined with the corresponding segment descriptors 302 specify the processor environment for each specific fault handler 115.

Following the fault vector pointer table 130 in reserved memory 85 is a one word fault-on-fault entry descriptor address 138 of a two word entry descriptor 304 for the fault-on-fault fault handler. Upon system initialization, each of the entries in the fault vector pointer table 130 is initialized by the service processor 87 to a constant value (032 octal). This constant value (032 octal) is the address of a two word entry descriptor 304 of a general fault handler 112. The fault-on-fault entry descriptor address 138 is similarly initialized to a constant value (040 octal). This second constant value (040) is the address of a two word entry descriptor 304 of a fault-on-fault handler 112. Also stored in specific areas of reserved memory 85 by system initialization or "boot" software are the contents of specific areas of memory critical to rebuilding processor 92 environment upon detection of a fault-on-fault situation. Included in this saved information are the two word entry descriptors 304 for the general fault handler 112 and the fault-on-fault handler.

The reserved memory 85 contains both a processor specific portion for each processor 92 in the system 80 and a shared portion. In this shared portion of the reserved memory 85 is Intercept code. Within this Intercept code is an improved fault-on-fault hander. This improved fault-on-fault handler takes the information saved in the reserved memory 85 and rebuilds a minimal processor environment. This rebuilding includes loading environmental registers and initializing work space zero (WSO) which contains critical operating system code and data.

Putting this information and code in reserved memory 85 has a number of advantages. Reserved memory 85 cannot be written inadvertently. It is never made part of any work space, nor ever framed by a segment descriptor 302. In the preferred embodiment, it can be read via I/O, but not written. It is thus safe from being accidentally overwritten. Since the fault-on-fault handler, as well as the descriptors to it are stored in reserved memory 85, neither the fault-on-fault handler, nor the descriptors 302, 304 needed to enter it, can be inadvertently overwritten. Thus, it is now possible to guarantee that memory dumps can be performed even in a fault-on-fault situation where critical portions of the operating system have been overwritten.

As noted above, the service processor 87 initializes the fault vector pointer table 130 to a value (032) corresponding to the address of the entry descriptor 304 of a general fault hander 112 in the operating system. The operating system then rewrites some or all of these fault vector pointer table 130 entries 131 to point at entry descriptors 304 for specific fault handers 115. This provides a transitional methodology. Initially, the system operates as shown in FIG. 6. Then as fault handler code is modified over time, pointers to different specific fault handlers 115 can be written to the fault vector pointer table 130 as the code is modified to operate as shown in FIG. 7. Some fault types are rare enough that it may not be economically worthwhile to modify the corresponding specific fault handers 115. For example, in the exceedingly rare category are such faults as STUP (startup), LUF (lockup), and SDF (shutdown). Other fault types, being much more common, can be profitably migrated much quicker. For example, in the extremely common category are such faults as DVCF (divide check), OFL (overflow), MSG (missing segment), MWS (missing work space), MSCT (missing section), and MPF (missing page).

Figure 9:
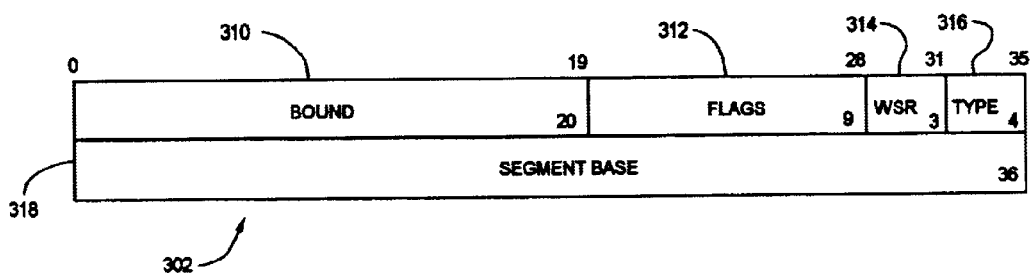
FIGS. 9 and 10 are diagrams that illustrate the format of two different types of descriptors in a GCOS 8 environment.
Figure 10:
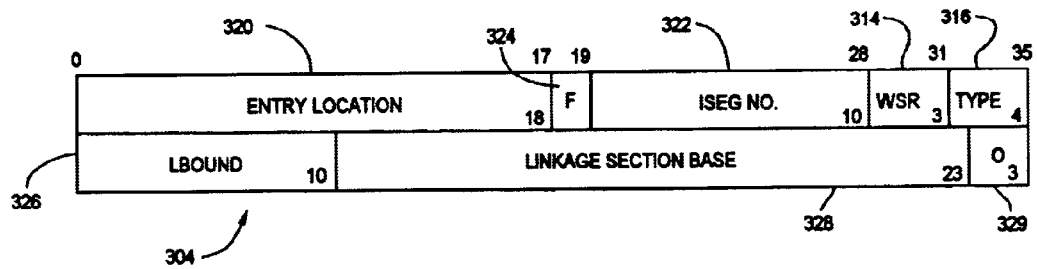

FIGS. 9 and 10 are diagrams that illustrate the format of two different types of descriptors in a GCOS 8 environment. Thirteen segment descriptor registers are supported in the GCOS 8 architecture, and they are: eight Segment Descriptor Registers (DR0 through DR7) for operand addressing; an Argument Stack Register (ASR); a Data Stack Descriptor Register (DSDR); an Instruction Segment Register (ISR); a Linkage Segment Register (LSR); and a Parameter Segment Register (PSR). In the GCOS 8 environment, segment descriptors are 72-bits in size and are used to describe a contiguous subset of a working space.

FIG. 9 is a diagram illustrating a standard Segment Descriptor. A Segment Descriptor defines a contiguous extent of virtual space. The Segment Descriptor 302 comprises two 36-bit words stored in two words of memory or in a single 72-bit register. The format of the Segment Descriptor is shown in table T-4:

TABLE T-4

Standard Segment Descriptor 302 Format

| Ref# | Wd | St | Ed | B# | Field Name | Field Description |
|------|----|----|----|----|------------|-------------------|
| 310 | 0 | 00 | 19 | 20 | Bound | Segment upper bound |
| 312 | 0 | 20 | 28 | 9 | Flags | Flags:<br>20 - Read allowed<br>21 - Write allowed<br>22 - Store by STDn allowed<br>23 - Cache use control<br>24 - NS/ES mode<br>25 - Execute allowed<br>26 - Privilege required<br>27 - Bound valid<br>28 - Segment available |
| 314 | 0 | 29 | 31 | 3 | WSR | Working Space Register |
| 316 | 0 | 32 | 35 | 4 | Type | Segment Descriptor Type<br>0 - frames operand space<br>1 - frames descriptor space<br>12 - extended descriptor |
| 318 | 1 | 0 | 35 | 36 | Base | Segment Base Address |

The 3-bit Working Space Register (WSR) 314 field designates one of eight 9-bit working space registers. The contents of the selected WSR 314 are retrieved and used as the working space for the segment. The 20-bit bound field 324 contains the maximum valid byte address within the segment. The 36-bit base field 318 contains a virtual byte address that is relative to the start of the designated working space defined by the WSR 314. Bits 0:33 are a 34-bit word address, and bits 34:35 identifying a 9-bit byte within the word.

FIG. 10 is a diagram illustrating the format of an Entry Descriptor 304. Entry Descriptors 304 are utilized by the ICLIMB instruction for domain transfer subroutine calls, as well as entry into Fault (or Exception) and Interrupt processing. The Entry Descriptor 304 is a Descriptor that defines the execution environment and starting address of a subroutine. The Entry Descriptor 304 comprises two 36-bit words stored in two words of memory or in a single 72-bit register. The format of an Entry Descriptor 304 is shown in table T-2:

TABLE T-2

Entry Descriptor 304 Format

| Ref# | Wd | St | Ed | B# | Field Name | Field Description |
|------|----|----|----|----|------------|-------------------|
| 320 | 0 | 00 | 17 | 18 | Entry Location | Entry address relative to base of new instruction segment |
| 324 | 0 | 18 | 18 | 1 | F | Store permission bit |
| 322 | 0 | 19 | 28 | 10 | ISEG No. | Number of descriptor to be loaded into the Instruction Segment Register (ISR) |
| 314 | 0 | 29 | 31 | 3 | WSR | Working Space Register |
| 316 | 0 | 32 | 35 | 4 | Type | Entry Descriptor Type 8 – 16 word stack frame 9 – 24 word stack frame 11 – 64/80 word stack frame |
| 326 | 1 | 00 | 10 | 20 | LBound | Linkage Segment upper bound (in descriptors) |
| 328 | 1 | 11 | 23 | 13 | Linkage Base | Segment Base Address |
| 329 | 1 | 33 | 35 | 3 |  | Zeroes |

An Entry Descriptor 304 describes a linkage section that defines a new domain, a segment containing instructions to be initially executed in the domain, and an offset relative to the origin of that segment to which control is transferred.

The 3-bit Working Space Register (WSR) 314 field designates one of eight 9-bit working space registers. The contents of the selected WSR 314 are retrieved and used as the working space for the Entry Descriptor 304. The virtual starting address of a Linkage Section in the working space designated by the WSR field 314 is determined from the Linkage Base 328 address field. The Linkage Segment contains a number of Type=0 Segment Descriptors 302. The number of Segment Descriptors 302 in the Linkage Segment is specified by the LBOUND field 326 in the Entry Descriptor. The ISEG number 322 in the Entry Descriptor 304 is utilized as an index to index into these Segment Descriptors 302. The indexed Segment Descriptor 302 is then loaded into the Instruction Segment Register (ISR) in order to specify a new execution environment. The Entry Location 320 field in the Entry Descriptor 304 is then utilized to identify the starting address in the segment described by the ISR.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A fault vector pointer table stored in a memory wherein: the fault vector pointer table comprises:
    a plurality of fault vector pointers organized in a table indexable by a fault number utilized as a fault vector pointer table index, wherein:
        each of the plurality of fault vector pointers is a fault vector pointer that points at an entry descriptor that describes a fault routine; and
        at least two of the plurality of fault vector pointers point at a same entry descriptor.
2. The fault vector pointer table in claim 1 wherein: the memory is a reserved memory in which input/output actions are inhibited.
3. The fault vector pointer table in claim 1 wherein:
    each entry descriptor pointed at by at least one of the plurality of fault vector pointers identifies a work space containing the fault routine described by that entry descriptor.
4. The fault vector pointer table in claim 1 wherein:
    each entry descriptor pointed at by at least one of the plurality of fault vector pointers identifies a segment containing the fault routine described by that entry descriptor.
5. The fault vector pointer table in claim 4 wherein:
    each entry descriptor pointed at by at least one of the plurality of fault vector pointers specifies an entry point into the fault routine described by that entry descriptor.
6. The fault vector pointer table in claim 5 wherein:
    the entry point into the fault routine described by that entry descriptor is relative to the segment containing the fault routine.
7. The fault vector pointer table in claim 1 wherein:
    each entry descriptor pointed at by at least one of the plurality of fault vector pointers is validity checked before transfer is made into the fault routine described by that entry descriptor.
8. The fault vector pointer table in claim 1 wherein:
    each entry descriptor pointed at by at least one of the plurality of fault vector pointers identifies privileges for the fault routine described by that entry descriptor.
9. The fault vector pointer table in claim 1 wherein:
    each entry descriptor pointed at by at least one of the plurality of fault vector pointers comprises:
        identification of a work space containing the fault routine described by that entry descriptor;
        identification of a segment containing the fault routine described by that entry descriptor; and
        a starting address relative to the segment containing the fault routine described by that fault descriptor.
10. A data processing system having a memory, and stored within the memory is a fault vector pointer table, wherein:
    the fault vector pointer table comprises:
        a plurality of fault vector pointers organized in a table indexable by a fault number utilized as a fault vector pointer table index, wherein:
            each of the plurality of fault vector pointers is a fault vector pointer that points at an entry descriptor that describes a fault routine; and
            at least two of the plurality of fault vector pointers point at a same entry descriptor.
11. The data processing system in claim 10 wherein:
    the memory is a reserved memory in which input/output actions are inhibited.
12. The data processing system in claim 10 wherein:
    each entry descriptor pointed at by at least one of the plurality of fault vector pointers identifies a work space containing the fault routine described by that entry descriptor.
13. The data processing system in claim 10 wherein:
    each entry descriptor pointed at by at least one of the plurality of fault vector pointers identifies a segment containing the fault routine described by that entry descriptor.
14. The data processing system in claim 13 wherein:
    each entry descriptor pointed at by at least one of the plurality of fault vector pointers specifies an entry point into the fault routine described by that entry descriptor.
15. The data processing system in claim 14 wherein:

the entry point into the fault routine described by that entry descriptor is relative to the segment containing the fault routine.

16. The data processing system in claim 10, wherein:

each entry descriptor pointed at by at least one of the plurality of fault vector pointers is validity checked before transfer is made into the fault routine described by that entry descriptor.

17. The data processing system in claim 10 wherein:

each entry descriptor pointed at by at least one of the plurality of fault vector pointers identifies privileges for the fault routine described by that entry descriptor.

18. The fault vector pointer table in claim 10 wherein:

each entry descriptor pointed at by at least one of the plurality of fault vector pointers comprises:
   identification of a work space containing the fault routine described by that entry descriptor;
   identification of a segment containing the fault routine described by that entry descriptor; and
   a starting address relative to the segment containing the fault routine described by that fault descriptor.

19. A machine readable medium containing a fault vector pointer table to be stored within the memory in a data processing system wherein:

the fault vector pointer table comprises:
   a plurality of fault vector pointers organized in a table indexable by a fault number utilized as a fault vector pointer table index, wherein:
      each of the plurality of fault vector pointers is a fault vector pointer that points at an entry descriptor that describes a fault routine; and
      at least two of the plurality of fault vector pointers point at a same entry descriptor.

* * * * *